United States Patent
Jeng et al.

(10) Patent No.: US 11,042,884 B2
(45) Date of Patent: Jun. 22, 2021

(54) METHOD AND APPARATUS FOR USING META-RULES TO SUPPORT DYNAMIC RULE-BASED BUSINESS SYSTEMS

(75) Inventors: Jun-Jang Jeng, Armonk, NY (US);
Shubir Kapoor, Shrub Oak, NY (US);
David Flaxer, Dobbs Ferry, NY (US);
Haifei Li, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 2258 days.

(21) Appl. No.: 12/058,071

(22) Filed: Mar. 28, 2008

(65) Prior Publication Data

US 2008/0177689 A1    Jul. 24, 2008

Related U.S. Application Data

(63) Continuation-in-part of application No. 10/852,421, filed on May 25, 2004, now abandoned.

(51) Int. Cl.
| | | |
|---|---|---|
| *G06Q 30/00* | (2012.01) | |
| *G06Q 10/06* | (2012.01) | |
| *G06N 5/02* | (2006.01) | |

(52) U.S. Cl.
CPC .............. *G06Q 30/00* (2013.01); *G06N 5/025* (2013.01); *G06Q 10/06375* (2013.01)

(58) Field of Classification Search
CPC ... G06Q 10/10; G06Q 30/00; G06Q 10/06375
See application file for complete search history.

(56) References Cited

U.S. PATENT DOCUMENTS 6,108,786 A * 8/2000 Knowlson ............. H04L 63/104
                                                        713/151
6,138,139 A * 10/2000 Beck .................. G06Q 30/0641
                                                        709/202

(Continued)

FOREIGN PATENT DOCUMENTS

| AU | 2006269467 A1 * | 1/2007 | ............. G06Q 50/01 |
| CA | 2607698 A1 * | 4/2008 | ......... G06Q 30/0601 |

(Continued)

OTHER PUBLICATIONS

IP.IQ.com12058071 Searches. (Year: 2021).*

(Continued)

*Primary Examiner* — Tan D Nguyen
(74) *Attorney, Agent, or Firm* — Daniel Morris; Otterstedt, Wallace & Kammer, LLP

(57) ABSTRACT

Meta-Rules are a special set of business rules whose purpose is to enable business rules selection and subsequent rule invocation by a business rules manager. Contained within a Meta-Rule are business policy and other information that enables the selection of a business rule used by a business application. Meta-rules allow the system to dynamically select and identify specific business rules to be executed within a given business application. By enabling a higher level of abstraction, and relying on rules to resolve specific business rule selection and invocations, Meta-rules further separate the binding of business knowledge and practice from application programming logic. The application programmer is freed from having specific knowledge of the business rule; all that is required is an assertion that a rule is to be used.

11 Claims, 7 Drawing Sheets

(56) References Cited

U.S. PATENT DOCUMENTS

| | | | |
|---|---|---|---|
| 6,167,395 A * | 12/2000 | Beck | H04L 69/329 |
| 6,170,011 B1 * | 1/2001 | Macleod Beck | G06Q 10/06 |
| | | | 709/224 |
| 6,381,640 B1 * | 4/2002 | Beck | G06K 13/0825 |
| | | | 709/223 |
| 6,434,628 B1 * | 8/2002 | Bowman-Amuah | H04L 29/06 |
| | | | 714/1 |
| 6,738,975 B1 * | 5/2004 | Yee | G06F 9/541 |
| | | | 719/310 |
| 6,820,135 B1 * | 11/2004 | Dingman et al. | 709/246 |
| 7,027,463 B2 * | 4/2006 | Mathew | G06Q 10/10 |
| | | | 370/395.32 |
| 7,039,595 B1 * | 5/2006 | Lilly | G06Q 10/0631 |
| | | | 705/7.25 |
| 7,151,438 B1 * | 12/2006 | Hall | G06Q 10/10 |
| | | | 340/286.06 |
| 7,263,505 B1 * | 8/2007 | Forlai | G06Q 10/06375 |
| | | | 705/37 |
| 7,318,046 B1 * | 1/2008 | Wellons | G06Q 30/06 |
| | | | 705/38 |
| 7,340,406 B1 * | 3/2008 | Tribble | G06Q 10/0637 |
| | | | 705/7.36 |
| 7,386,475 B2 * | 6/2008 | Parasnis | G06Q 10/087 |
| | | | 705/26.4 |
| 7,444,342 B1 * | 10/2008 | Hall | G06F 16/283 |
| 7,478,404 B1 * | 1/2009 | Campbell | H04L 67/1097 |
| | | | 719/318 |
| 7,565,443 B2 * | 7/2009 | Rossmanith | G06F 9/546 |
| | | | 709/202 |
| 7,606,727 B1 * | 10/2009 | Pederson | G06Q 10/06375 |
| | | | 705/7.29 |
| 7,870,033 B2 * | 1/2011 | Swanson | G06Q 30/0603 |
| | | | 705/26.1 |
| 8,015,541 B1 * | 9/2011 | Srinivasan | G06Q 10/107 |
| | | | 717/104 |
| 10,364,662 B1 * | 7/2019 | Basu | G05B 13/048 |
| 2001/0011295 A1 * | 8/2001 | Kobayashi | G06Q 10/06 |
| | | | 709/201 |
| 2001/0011366 A1 * | 8/2001 | Beck | G06F 9/45512 |
| | | | 717/100 |
| 2001/0025309 A1 * | 9/2001 | Macleod Beck | G06F 40/279 |
| | | | 709/223 |
| 2002/0022982 A1 * | 2/2002 | Cooperstone | G06Q 10/1057 |
| | | | 705/1.1 |
| 2002/0069081 A1 * | 6/2002 | Ingram | G06Q 30/02 |
| | | | 715/700 |
| 2002/0107957 A1 * | 8/2002 | Zargham | G06Q 10/06 |
| | | | 709/224 |
| 2002/0161624 A1 * | 10/2002 | Bradlee | G06Q 30/0201 |
| | | | 705/7.25 |
| 2002/0165903 A1 * | 11/2002 | Zargham | G06Q 10/06 |
| | | | 709/202 |
| 2003/0023573 A1 * | 1/2003 | Chan | G06N 5/022 |
| | | | 706/47 |
| 2003/0079146 A1 * | 4/2003 | Burstein | H04L 63/029 |
| | | | 726/12 |
| 2003/0090514 A1 * | 5/2003 | Cole | G06Q 10/10 |
| | | | 715/744 |
| 2003/0101338 A1 * | 5/2003 | Mullen | H04L 63/0236 |
| | | | 713/152 |
| 2003/0191679 A1 * | 10/2003 | Casati | G06Q 10/109 |
| | | | 705/7.12 |
| 2003/0208493 A1 * | 11/2003 | Hall | G06F 16/289 |
| 2003/0220860 A1 * | 11/2003 | Heytens | G06Q 30/0201 |
| | | | 705/35 |
| 2003/0220901 A1 * | 11/2003 | Carr | G06F 16/217 |
| 2003/0233376 A1 * | 12/2003 | Bussler | G06F 16/258 |
| 2004/0054610 A1 * | 3/2004 | Amstutz | G06Q 40/06 |
| | | | 705/36 R |
| 2004/0153536 A1 * | 8/2004 | Strassner | H04L 41/0813 |
| | | | 709/223 |
| 2004/0194069 A1 * | 9/2004 | Surasinghe | G06Q 10/10 |
| | | | 717/136 |
| 2004/0226051 A1 * | 11/2004 | Carney | H04N 21/8545 |
| | | | 725/135 |
| 2004/0250258 A1 * | 12/2004 | Raghuvir | G06F 8/71 |
| | | | 719/315 |
| 2005/0005259 A1 * | 1/2005 | Avery | G06Q 10/10 |
| | | | 717/103 |
| 2005/0071222 A1 * | 3/2005 | Bigus | G06Q 30/02 |
| | | | 705/14.13 |
| 2005/0086640 A1 * | 4/2005 | Kolehmainen | G06F 9/445 |
| | | | 717/120 |
| 2005/0102530 A1 * | 5/2005 | Burrows | G06F 21/6218 |
| | | | 726/1 |
| 2005/0149558 A1 * | 7/2005 | Zhuk | G06F 8/10 |
| 2005/0164704 A1 * | 7/2005 | Winsor | G06F 16/9535 |
| | | | 455/432.3 |
| 2005/0171980 A1 * | 8/2005 | Fernandez | G06F 16/258 |
| 2005/0216555 A1 * | 9/2005 | English | G06Q 50/18 |
| | | | 709/204 |
| 2005/0222931 A1 * | 10/2005 | Mamou | G06F 16/254 |
| | | | 705/35 |
| 2005/0223109 A1 * | 10/2005 | Mamou | G06F 16/254 |
| | | | 709/232 |
| 2005/0228808 A1 * | 10/2005 | Mamou | G06F 16/254 |
| 2005/0232046 A1 * | 10/2005 | Mamou | G06F 16/254 |
| | | | 365/220 |
| 2005/0234969 A1 * | 10/2005 | Mamou | G06F 16/254 |
| 2005/0235274 A1 * | 10/2005 | Mamou | G06Q 10/10 |
| | | | 717/136 |
| 2005/0240354 A1 * | 10/2005 | Mamou | G06Q 10/10 |
| | | | 702/19 |
| 2005/0240592 A1 * | 10/2005 | Mamou | G06F 16/254 |
| 2005/0251501 A1 * | 11/2005 | Phillips | G06F 16/958 |
| 2005/0251527 A1 * | 11/2005 | Phillips | G06Q 10/06 |
| 2005/0262085 A1 * | 11/2005 | Durocher | G06F 8/38 |
| 2005/0262188 A1 * | 11/2005 | Mamou | G06Q 10/10 |
| | | | 709/203 |
| 2005/0262189 A1 * | 11/2005 | Mamou | G06Q 10/10 |
| | | | 709/203 |
| 2005/0262190 A1 * | 11/2005 | Mamou | G06F 16/254 |
| | | | 709/203 |
| 2005/0262191 A1 * | 11/2005 | Mamou | G06F 16/254 |
| | | | 709/203 |
| 2005/0262192 A1 * | 11/2005 | Mamou | G06Q 10/10 |
| | | | 709/203 |
| 2005/0262193 A1 * | 11/2005 | Mamou | G06F 16/254 |
| | | | 709/203 |
| 2005/0262194 A1 * | 11/2005 | Mamou | G06Q 10/10 |
| | | | 709/203 |
| 2005/0267892 A1 * | 12/2005 | Patrick et al. | 707/10 |
| 2005/0283397 A1 * | 12/2005 | Rimsky | G06Q 30/0205 |
| | | | 705/7.34 |
| 2006/0004802 A1 * | 1/2006 | Phillips | G06F 9/4843 |
| 2006/0009991 A1 * | 1/2006 | Jeng | G06Q 10/06375 |
| | | | 705/1.1 |
| 2006/0010195 A1 * | 1/2006 | Mamou | G06Q 10/10 |
| | | | 709/203 |
| 2006/0026054 A1 * | 2/2006 | Barel | G06Q 30/0203 |
| | | | 705/7.37 |
| 2006/0069717 A1 * | 3/2006 | Mamou | G06Q 10/00 |
| | | | 709/203 |
| 2006/0075396 A1 * | 4/2006 | Surasinghe | H04M 15/43 |
| | | | 717/168 |
| 2006/0085290 A1 * | 4/2006 | Pohoryles | G06Q 30/00 |
| | | | 705/7.37 |
| 2006/0095274 A1 * | 5/2006 | Phillips | G06Q 99/00 |
| | | | 717/108 |
| 2006/0143439 A1 * | 6/2006 | Arumugam | G06Q 10/08 |
| | | | 713/153 |
| 2006/0195816 A1 * | 8/2006 | Grandcolas | G06Q 40/02 |
| | | | 717/101 |
| 2006/0206503 A1 * | 9/2006 | Gaurav | G06F 40/221 |
| 2006/0206523 A1 * | 9/2006 | Gaurav | G06F 40/14 |
| 2006/0218061 A1 * | 9/2006 | Mouline | G06Q 40/02 |
| | | | 705/35 |

(56) References Cited

U.S. PATENT DOCUMENTS

| | | | |
|---|---|---|---|
| 2006/0241961 A1* | 10/2006 | Tsyganskiy | G06Q 10/067 717/104 |
| 2006/0241999 A1* | 10/2006 | Tsyganskiy | G06Q 10/067 705/348 |
| 2006/0242170 A1* | 10/2006 | Tsyganskiy | G06F 8/72 |
| 2006/0242171 A1* | 10/2006 | Tsyganskiy | G06F 8/72 |
| 2006/0242172 A1* | 10/2006 | Tsyganskiy | G06F 8/72 |
| 2006/0242173 A1* | 10/2006 | Tsyganskiy | G06F 8/72 |
| 2006/0242174 A1* | 10/2006 | Tsyganskiy | G06F 8/72 |
| 2006/0242175 A1* | 10/2006 | Tsyganskiy | G06F 8/72 |
| 2006/0242176 A1* | 10/2006 | Tsyganskiy | G06F 8/72 |
| 2006/0242177 A1* | 10/2006 | Tsyganskiy | G06F 8/72 |
| 2006/0242188 A1* | 10/2006 | Tsyganskiy | G06F 8/72 |
| 2006/0242196 A1* | 10/2006 | Tsyganskiy | G06F 8/72 |
| 2006/0242197 A1* | 10/2006 | Tsyganskiy | G06F 8/72 |
| 2006/0242207 A1* | 10/2006 | Tsyganskiy | G06F 8/72 |
| 2006/0259603 A1* | 11/2006 | Shrader | H04L 67/28 709/223 |
| 2006/0282458 A1* | 12/2006 | Tsyganskiy | G06F 8/72 |
| 2006/0293934 A1* | 12/2006 | Tsyganskiy | G06Q 30/0201 705/7.29 |
| 2006/0293935 A1* | 12/2006 | Tsyganskiy | G06Q 10/06375 705/7.29 |
| 2006/0293940 A1* | 12/2006 | Tsyganskiy | G06Q 30/0201 705/7.29 |
| 2006/0294158 A1* | 12/2006 | Tsyganskiy | G06F 8/72 |
| 2007/0027801 A1* | 2/2007 | Botzer | G06Q 40/00 705/39 |
| 2007/0027934 A1* | 2/2007 | Roehrle | G06Q 10/06 |
| 2007/0038683 A1* | 2/2007 | Dixon | G06Q 10/10 |
| 2007/0094199 A1* | 4/2007 | Deshpande | G06Q 10/10 706/47 |
| 2007/0100684 A1* | 5/2007 | Gartner | G06Q 10/06375 705/7.29 |
| 2007/0118545 A1* | 5/2007 | Chandrasekharan | G06Q 10/10 |
| 2007/0150480 A1* | 6/2007 | Hwang | H04M 3/42161 |
| 2007/0168370 A1* | 7/2007 | Hardy | G06F 16/29 |
| 2007/0198586 A1* | 8/2007 | Hardy | G06F 16/29 |
| 2007/0255713 A1* | 11/2007 | Li | G06Q 10/06 |
| 2007/0255715 A1* | 11/2007 | Li | G06Q 10/00 |
| 2007/0255781 A1* | 11/2007 | Li | H04L 67/28 709/201 |
| 2008/0059263 A1* | 3/2008 | Stroman | G06Q 30/0201 705/7.25 |
| 2008/0086564 A1* | 4/2008 | Putman | H04L 29/06 709/227 |
| 2008/0086717 A1* | 4/2008 | Brunn | G06F 8/34 717/117 |
| 2008/0104092 A1* | 5/2008 | Cummins | G06Q 10/06 |
| 2008/0115104 A1* | 5/2008 | Quinn | G06Q 10/00 717/101 |
| 2008/0133322 A1* | 6/2008 | Kalia | G06Q 30/0205 705/7.34 |
| 2008/0183552 A1* | 7/2008 | O'Hagan | G06Q 10/06375 705/7.31 |
| 2008/0201248 A1* | 8/2008 | Wellons | H04M 3/51 705/35 |
| 2008/0288310 A1* | 11/2008 | Aaltonen | G06Q 30/00 705/14.42 |
| 2008/0307392 A1* | 12/2008 | Racca | G06Q 10/06 717/120 |
| 2008/0313018 A1* | 12/2008 | Kamm, IV | G06Q 30/00 705/7.12 |
| 2008/0320486 A1* | 12/2008 | Bose | G06Q 10/10 718/105 |
| 2009/0006159 A1* | 1/2009 | Mohr | G06Q 30/0205 705/7.13 |
| 2009/0063242 A1* | 3/2009 | Shaouy | G06Q 10/1097 705/7.14 |
| 2009/0259500 A1* | 10/2009 | Sahoo | G06Q 10/06375 705/7.37 |
| 2009/0282392 A1* | 11/2009 | Russell | G06F 16/258 717/131 |
| 2009/0287775 A1* | 11/2009 | Ng | G06F 16/957 709/205 |
| 2010/0169224 A1* | 7/2010 | Ramberg | G06Q 30/00 705/71 |
| 2011/0004509 A1* | 1/2011 | Wu | G06Q 10/06375 705/7.37 |
| 2011/0066486 A1* | 3/2011 | Bassin | G06Q 10/103 705/14.43 |

FOREIGN PATENT DOCUMENTS

| | | | | |
|---|---|---|---|---|
| WO | WO-0211027 A1 * | 2/2002 | | G06Q 10/06316 |
| WO | WO200504330 * | 5/2005 | | G06F 3/04847 |
| WO | WO-2005043330 A2 * | 5/2005 | | G06F 3/04847 |

OTHER PUBLICATIONS

GoogleScholar12058071 Searches. (Year: 2021).*

Jeng, JJ, "RuleBAM: A Rule-Based Framework For Business Activity Management", IEEE Conference 2004, pp. 262-270. (Year: 2004).*

Kardais, P., "Expressing and Organizing Business Rules", Information and Software Technology 46 (2004), pp. 701-718. (Year: 2004).*

* cited by examiner

METHOD AND APPARATUS FOR USING META-RULES TO SUPPORT DYNAMIC RULE-BASED BUSINESS SYSTEMS

CROSS-REFERENCE TO RELATED APPLICATION(S)

This application is a continuation of U.S. patent application Ser. No. 10/852,421 filed May 25, 2004 now abandoned, and claims the benefit thereof.

BACKGROUND OF THE INVENTION

1. Field of the Invention

The present invention generally relates to business process management and, more particularly, to the application of meta-rules that support dynamic rule based business systems to evaluate and select specific business rules.

2. Background Definitions

Business Rules

Business Rules are expressions that describe and control the processes, operations and behavior of how an enterprise, and the applications that support it, performs. Rules define, constrain or validate some aspect of a system through the evaluation of conditions and context of the rule invoker. Rules assert influence over business or system behavior by recommending actions to be undertaken. A rule provides its invoker a directive on how to proceed. Further, rules provide a generalized mechanism for officiating and specifying frequently changing practices, freeing system components from the burden of evaluating the evolving business and system environments.

In the Meta-Rules System, the origin of rules rests in the domain of policy. Policy is a descriptive intention of both how a business process or system is to work and added control on a business process itself. A policy refers to the set of externalized properties of a target system. Policy possesses certain attributes: it has to be both measurable and enforceable. Policy is applied to all levels of modeling, including: business, operation, and implementation. Policy is composed of statements that describe:

Commitment—What the system is supposed to accomplish and how it is to perform. An example of commitment is: "all orders are to be processed in the time specified in the trading partner agreement."

Constraint—What limits are applied on a system. For example: "no process is to exceed a specified capacity."

Control—Provides control of processes and resources based on role, type and authorization. Stating that: "only vice presidents of an organization are entitled to view web based summary profit tables", is an example of control.

Violation—Directs what to do when exceptions or other errors occur.

Rules are but one realization of policy. Applications and business processes implicitly contains policy that defines how the system works. Even programming logic, for example, embodies policy within its sequences of coded statements. In programming logic, policy is expected to be immutable, as modifications of code demand many skills and resources and generally results in a disruption of the application and business process. However, when policy is transformed into rules, and segregated from the static processes that employ it, it becomes easier to dynamically manage the system as a whole.

Rules are expressions that represent an implementation of policy. For example, a policy may simply state that "for our best customers order processing time must always be expedited." Other policies may exist in the system. The aggregation of these policies my result in the creation of one or more rule expressions such as: "gold" (best) customers are those that order greater than $100M per year; a gold customer is any customer placing an order greater than $1M; and, all orders for gold customers are expedited.

Context plays a significant role in the use of rules, and includes such condition and environmental information as: the current state of the process, the type of project task, specified business practices of the organization, historic data, and the predispositions of the specific user. Context may be contained in the various artifacts, objects and databases within the system. Therefore, rules employ a wide range of contextual information that encompasses an extensive scope of knowledge: they represent thresholds for actions, express acceptable business practices, and influence configuration, customization and personalization activities.

Rules may be used to influence the entire end-to-end process, spanning solution customization during build time, and presentation and application logic during runtime. Integration of business rules can affect a wide range of functional elements:

Business activity monitoring (sense and respond mechanisms)

Business process workflow (dynamic workflow generation)

Intelligent agents (directing value-add dynamic services)

Web services (and other technologies facilitating application interaction)

End-user interface (end user personalization)

Other solution customization

Information representing business rules have traditionally been embedded in application code and database structures. The problem with this is it:

1. Makes it very difficult to modify business policies as this may result in code changes and application outages.
2. Is hard to understand the implementation and consequence of changing business rules.
3. Is not easy to understand the complete business process.

By separating rules from procedural code, businesses can define and manage business practices as an entity independent from IT (Information Technology) implementation. Rules (and its predecessor policies) may be expressed non-programmatically, using descriptive terms that are more intuitive to business managers and other non-IT personnel.

In the Meta-Rules System, a rules system is one that contains the knowledge required to answer specific questions relating to business process or computational issues. The rules system provides answers in the form of messages; it is the responsibility of the invoker to take appropriate action based on the information provided. The rules system is deliberately limited to an advisory function and is not enabled to start actions or spin-off processes. As such the rules system models an oracle that is able to analyze questions and their context and provide recommended answers. In summary, an oracle is a "know all" external entity that is consulted for making decisions.

In performing its operation, the rules system consults the rules repository, data from autonomous agents, data from historical databases, business objects, artifacts, and other sources to evaluate and generate an answer. The rules system assists with problem tasks, such as: dynamic processes decision point where rules drive recommendations influencing the navigation of a possible solution path, dynamic optimization where rules are used to determine the best fit given multiple competing rules and real-time environmental conditions and decision support where rules are used to adjudicate a conflict resolution, recovery or negotiation process when conflicts are detected.

In the context of the Meta-Rules System, examples of business rules are:

Business rules are consulted to determine if business commitment thresholds have been exceeded, and if so, what corrective action to take. Example: If order fulfillment exceeds one week, notify customer representative and provide 5% discount on next order.

Business rules are consulted to determine next activities in a workflow where business commitments have been exceeded. Example 1: Prior to entering a workflow activity, conditions are evaluated by business rule to determine if the activity should be executed. Example 2: Workflow looks to business rules to dynamically compose a sequence of activities to execute based on business rules and operating context conditions.

Business rules are consulted to determine personalization of presentation or operation functions. Example 1: Prior to generating information for interfaces presentation, business rules determine user roles and viewing privileges. Example 2: To determine who and how to notify a trading partner when business commitments have been exceeded.

Meta-Rules

In the Meta-Rules System, Meta-Rules are a special set of business rules whose purpose is to enable business rules selection and subsequent rule invocation by the business rules manager. Contained within the Meta-Rule are business policy and other information that enables business rule selection. Result of Meta-rules may be:

Selection and identification of specific business rule instances to be invoked.

Specification of business rule types. These can include: reaction rules, derivation/inferencing rules, production rules, or database rules.

Location and type of business rules engines such as: ECA, Prolog, OPS5 or SQL applications.

Context information that describes the invoking application, business purpose, or other particular business information.

The application uses a Rule Proxy—an artifact contains information about the intent and purpose of the business rule invocation, along with content information-which the Meta-Rule consults to perform an evaluation. This information contained within the rule proxy is an indirect and abstract representation of what result is requested, and does not include how the evaluation should be accomplished as that is the role of the Meta-Rule. The Meta-Rule evaluation considers various conditions to conclude such things as:

Scope—Who are the intended targets of the business rule invocation?

Evaluation—What is the best method for executing the business rule and what rule engine is best suited to the purpose?

Constraints—What system conditions need to be accounted for in business rule selection?

Context—What additional context information needs to be provided to the business rule?

Two examples of Meta-Rules are:

1. If the intent is to determine the cost for a product for a customer, determine the appropriate business catalog, and select a rule engine that supports it, and select the business rule that generates the most customer value (for example least cost, or fastest delivery time).

2. If the intent is to select a service provider to fulfill a business process, based on the type of processes indicated, select the best evaluation method and rule set to generate an optimum selection.

In the examples described above, Meta-Rules do not provide the answer to the specific question being asked by the invoking applications, but rather, they provide the necessary information to the rule manager for it to invoke the most appropriate business rules, that, once executed, will return the answer the application has requested.

SUMMARY OF THE INVENTION

According to the invention, there are provided the concept and application of Meta-Rules to support dynamic rule based business systems. The use of business rules—expressions of when, how and under what condition a business system is to perform a given unit of work—is well known. Typically, business rules are segregated from the application procedural code that uses them, allowing a business practitioner to define and manage their business practices independent from IT implementation. However, the separation of rules from application program logics requires the application programmer to know in advance the identity of the rule (either by specific name or reference) to be used at a given point in the logic. This places undue restriction on the use of business rules, resulting in a lack of system flexibility and a resistance to the adaptation to changing business practices. To address this problem, the introduction of Meta-Rules—rules about business rules—is asserted. Meta-rules allows the system to dynamically select and identify specific business rules to be executed within a given business application. By enabling a higher level of abstraction, and relying on rules to resolve specific business rule selection and invocations, Meta-rules further separate the binding of business knowledge and practice from application programming logic. The application programmer is freed from having specific knowledge of the business rule; all that is required is an assertion that a rule is to be used. This invention further describes the concept of Meta-rules, describing how it works, introduces middleware components necessary to support the concept, and illustrates how it is used in a business system.

This invention describes the functional elements that comprise Meta-rules that support dynamic rule based business systems, a novel method and framework (henceforth referred to as the Meta-Rule System) whose objective is to support the advanced abstract separation and dynamic resolution of business rules and programming logic. The Meta-Rules System is composed of a customized assemblage of built-time and run-time components and artifacts proxies, Meta-rules, a rules manager service, and rules engines. Taken as a whole, these form a new method for support dynamic rule based business systems.

Problem Statement:

The business rules needs to be dynamically chosen and triggered.

The dependencies of business rule invocation on business context need to be materialized and controlled. Simple bindings between rule references and rule instances do not satisfy whole dynamism that serves as an enabler of on demand business.

Solution Statement:

Business rules selection and invocation are controlled by Meta-Rules.

Meta-Rules are rules governing the choices in the behavior of Rules Manager.

Value Statement:

Meta-Rules define the dependencies between business rules and other business entities. Meta-Rules are derived from business goals, service level agreements or trust relationship between enterprises.

Meta-Rules can be used to control the selection and invocation of a business rules. Since Meta-rules are also a form of business rules, they can be executed using the same rules engine and consulted by the same rules manager.

Meta-Rules inject business semantics into the bindings between business rule references (that are known to the rule proxies embedded in applications) and business rule instances (that are situated within the rules engine).

Meta-Rules can be used to specify constraints and policies of rules invocation over large number of business rules, perhaps hundreds of thousands of business rules in large enterprises. The same concept can be applied to Meta-Rules themselves; hence, hierarchical governance structure can be formed into business rules.

Meta-Rules provide the capability of updates/changes made to the rules are transparent to the underlying system by changing business policy.

The Meta-Rules System provides the capability of "hot deployment" of rules (by changes made to the policy or process), thus helping to build an adaptive system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The Meta-Rules System is a framework that supports the abstract invocation of business rules. The use of Meta-Rules evaluate and select the appropriate business rule and the invocation of the specific business rule. This system supports run-time services that, using Meta-Rules, perform dynamic selection and invocation of business rules. The basic framework of the Meta-Rules System is illustrated in FIG. 1 which presents its three key elements and their relations to one another.

Figure 1:
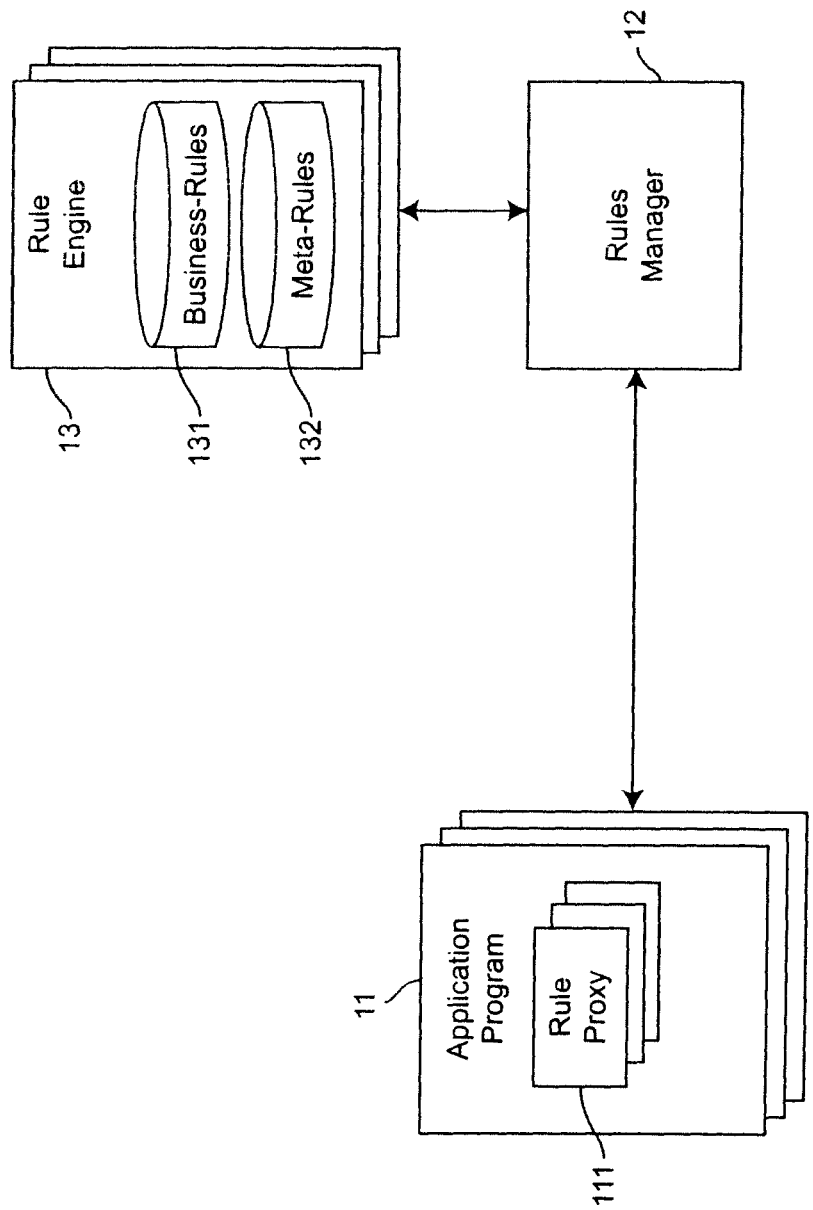
FIG. 1 is a block diagram showing the three basic components of the Meta-Rules System according to the present invention.

Referring to FIG. 1, the three basic components of a Meta-Rules System are Application Programs 11, Rules Manager 12, and Business Rules Engine 13. Within an Application Program there may be one or more points where the programming logic needs to use a business rule to determine a data or control action. These points are represented by a Rule-Proxy 111, a structured IT artifact that contains information used by the Rules Manager 12 and Business Rules Engine 13 to perform the requested evaluation. The Rules Manager 12 is a middleware service that acts as an intermediary between the Application Programs 11 and the Business Rules Engine 13. It manages and facilitates all required functions providing methods for component communication, rules invocation, context management, state change and process management. The Rules Manager 12 receives requests (Rule Proxies) from application programs, invokes Business Rule Engines as required, and returns the results back to the invoking application. Within the system there may be one or more Business Rules Engines 13 that executes business rules. The Business Rule Engines logically contain Meta-rules 132 and business rules 131 that are executed at the request of the Rules Manager 12.

The Rules Proxy 111 is the programming artifact that is used to support messages between the Application Program 11 and the Rules Manager 12. It is also used to contain the results from an invocation of Meta-rules that is returned to the rules manager for interpretation and additional processing. Thus, the information contained in the Rule Proxy 111 is used by the Rules Manager 12 to support both Meta-Rules and business rules to enable their respective operations.

Figure 2:
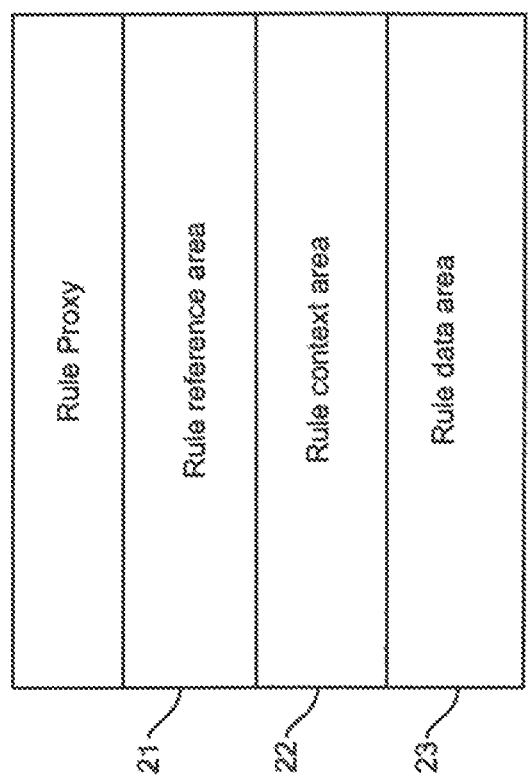
FIG. 2 is a block diagram showing the three basic components of the Rule Proxy in an application program in FIG. 1.

Referring to FIG. 2, there are three basic components of a Rules Proxy. The Rule Reference Area 21 is used by the Application Program to contain abstract and high level statements that describe the intent of the business rules to be used. This basic information is used by Meta-Rules to determine which business rules to invoke, and subsequently, appends this information in this area to be used by the rule manager when invoking business rules. The Rule Context Area 22 contains references to instances of artifacts (business objects, workflow flows, etc.) that comprise the context (execution environment) and facilitates data and control information required for rule evaluation. Also, this area optionally may include state machine instructions that provide additional control steps for the rule manager to follow. The Rule Data Area 23 is where specific parametric values required for rule evaluation are optionally written. It may also include additional information resulting from the rule invocation that is returned to the program application.

The Rules Manager 12 is a middleware service that acts as an intermediary between the Application Program 11 and the Business Rules Engines 13. It consists of various components that manages and facilitates the use of Meta or business rules, providing methods for component communication, rules invocation, context management, state change and process management.

Figure 3:
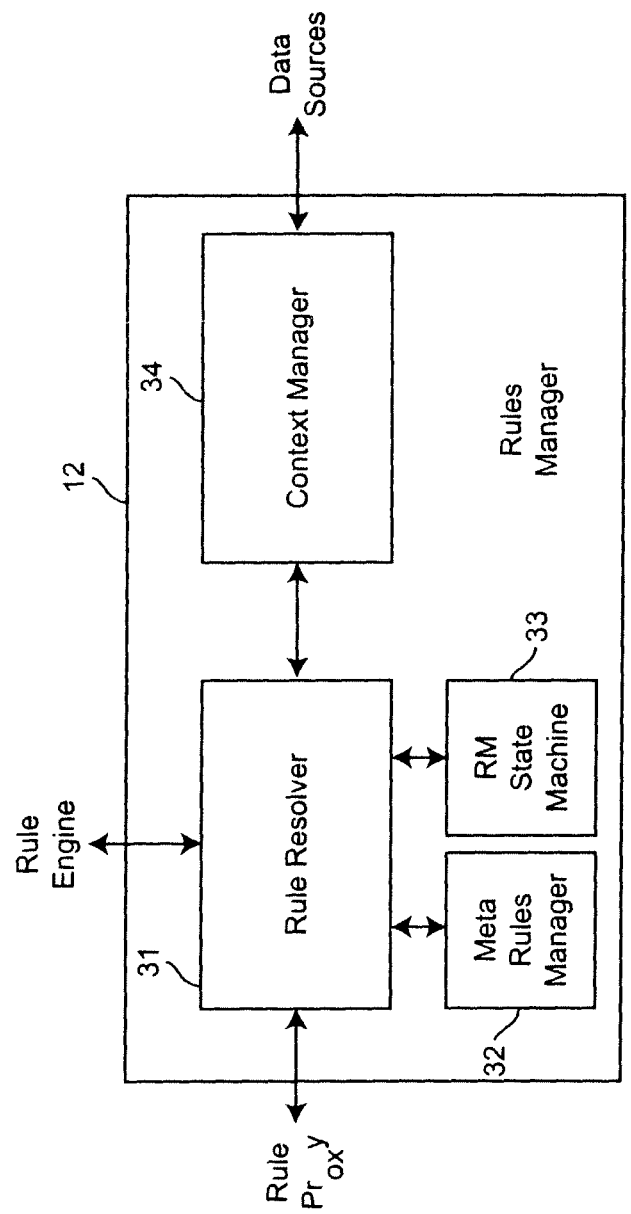
FIG. 3 is a block diagram showing the basic components of the Rules Manager in FIG. 1.

Referring to FIG. 3, the basic components of the Rules Manager are the Rules Resolver 31, the Meta Rules Manager 32, the Rule Manager State Machine 33, and the Context manager 34. The Rules Resolver 32 component manages the overall function of the Rules Manager. It supports external interfaces with the business application, and extracts reference and data extraction from the rule proxy. It interacts with other components internal to the rules manager, and enables a primary supervisory function, choreographing actions that include: consultation Meta-Rules manager for invocation and interpretation of Meta-rules; interaction with state machine to drive additional service functions; and coordination with context manager for accesses to additional data. The Rules Resolver 31 interacts with the various Business Rules Engines that operate within the system, binding to specified Meta or business rules, and invoking the rules engine service.

Meta-Rules are rules that determine business rule selection. The Meta-Rules Manager 32 performs the specialized function of interpreting the resultants of Meta-rules invocation, leading to the selection of business rules and rule engine. Meta and business rules resolution and binding may need additional evaluation that requires data and other processing within the service invoker (e.g., Application Program and Meta-rules). To preserve the separation of Application Program logic from Meta or business rules, the Application Program is provided a specification that directs additional processing, for rule resolution, driven by the Rule Manager State Machine 33. The state machine may use these instructions to direct contextual data acquisition, condition evaluation and late rule binding. This function has several values: it enables greater partitioning and abstraction of business rules by application; it supports increased flexibility and facilitates use and modification of business rules; and enhances code reuse and function.

The evaluation and processing of a Meta or business rule may involve data and other information contained in business artifacts. This information is based on the context of the Application Program, as represented in the context information area of the Rule Proxy. Using this information, and possibly coupled with state machine instructions, the Context Manager 34 enables interfaces that establishes access to data sources (databases or business artifacts) and extracts required information needed to process Meta or business rule requests.

The process flow for using Meta-rules is somewhat complicated due to the double invocation to the Business Rules Engine for each request for business rules usage by the Application Program. The first invocation to the Business Rules Engine is to use Meta-rules to determine the appropriate business rule to use. The second invocation to the Business Rules Engine is to invoke the business rule specified by the Meta-rule. While this does result in more processing and resource overhead, rule systems have significantly increased their efficiency, and are coupled to newer, faster processing and communication hardware; therefore, the issue of performance is not perceived as an encumbrance.

Figure 4:
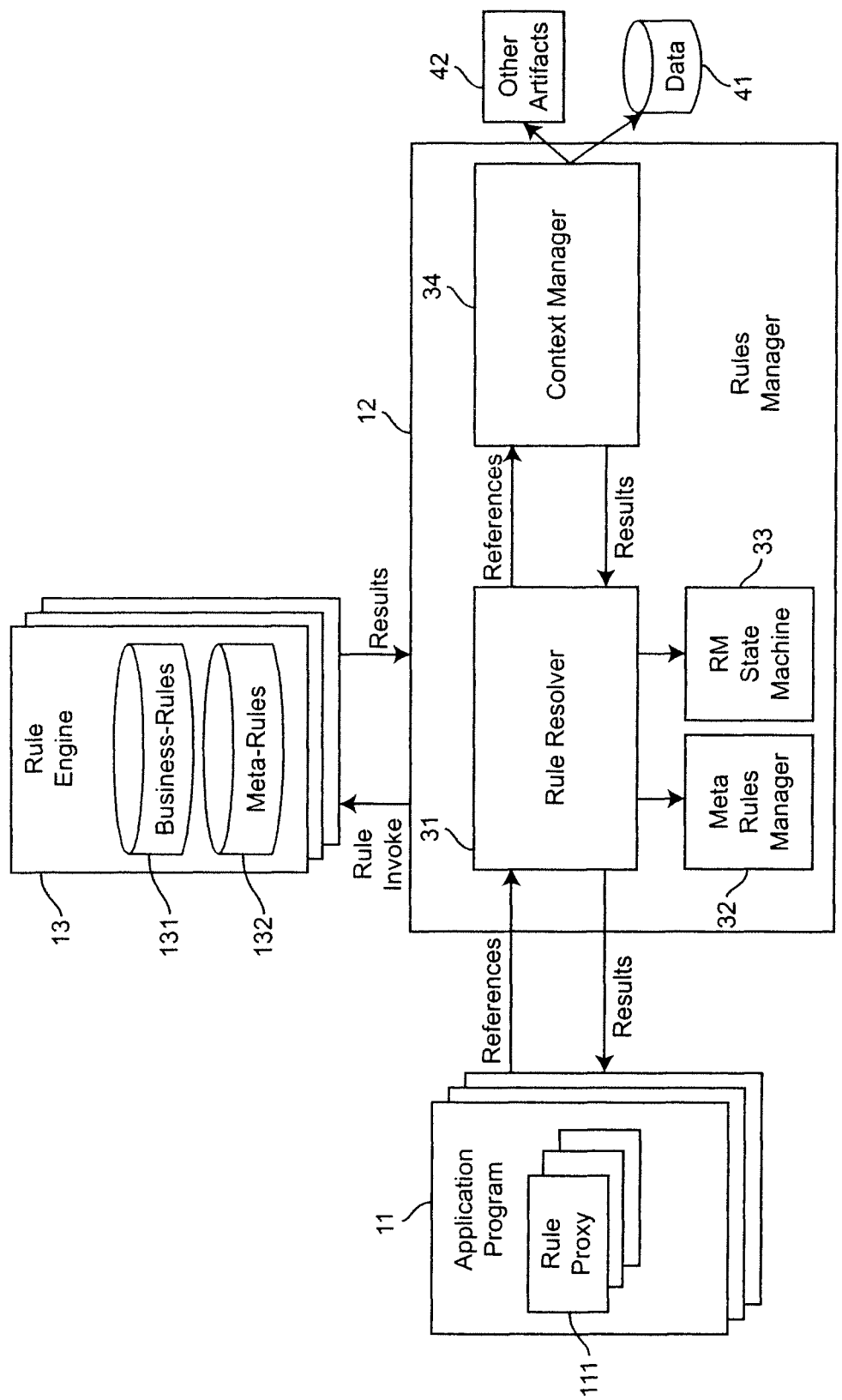
FIG. 4 is a block diagram showing the Meta-Rule flow in the Meta-Rules System of FIG. 1.

FIG. 4 presents a prototypical model system that supports a Meta-Rules System, which contains the three key components consisting of Application Program, Rules Manager and Business Rules Engine. Referring again to this figure, a typical flow proceeds as follows.

The Application Program 11 contains Rule Proxies 111 that indicates the use of rules to provide information and evaluation required by the programming logic. The Rule Proxy 111 contains abstract references indicate program intent, along with optional context, state machine information and parametric data. The Rule Proxy is passed to the Rules Manager 12 component.

The Rule Resolver 31 receives the Rule Proxy 111, interrogates it and with the help of the Meta-rules Manager 32, selects the Meta-rule and Business Rule Engine 13 to invoke. The results of firing the Meta-rule are placed in the Rule Proxy 111 and are returned to the Rules Resolver 31. Again, the Rule Resolver 31 interrogates the Rule Proxy 111 and it, with the help of the Meta-rules Manager 32, selects the business rule and rule engine to invoke. However, the Rule Resolver 31 also determines that additional context information is required prior to invoking the business rule.

Instructions on how to obtain additional contextual data are specified in the State Machine instructions contained in the Rule Proxy when it was constructed by the Application Program. These instructions are passed to the Rule Manager State Machine 33 that processes and executes them. To obtain context data, the State Machine 33 instructs the Context Manager 34 to obtain data from data stores 41 or business artifacts 42. This information is included in the rule data area of the Rule Proxy 111.

With the business rule selected, and the additional context information obtained, the Rule Resolver 31 invokes the specified business rule on the appropriate Business Rule Engine 13. The results from the firing of the rule are written in the rule data area of the Rule Proxy and are returned to the Rule Resolver 31. The Rule Resolver 31 returns the Rule Proxy 111 back to the invoking Application Program 11 that uses the information within the program logic.

The preferred embodiment of the Meta-Rules System to support a Business Activity Management (BAM) function will now be described. Business Activity Monitoring is the realization of a business process level sense-and-respond function whose purpose is to support the efficient flow of business activities within the computing environment. Using real-time critical business performance indicators, BAM improves the effectiveness and response times of business actions and decisions by monitoring business operations and intelligently responding to exception conditions specified in business commitment policy. BAM functions involve more than mechanically reacting to system alerts; rather, it needs to apply dynamic context sensitive logic to deduce the proper management actions. Examples of BAM operations include problem self-determination, risk self-detection, business analytics, process optimization, anomaly prevention, automatic invocation of compensation methods and self-adaption to changes within the computing environment. To accomplish these objectives, a BAM system consults business polices, in the form of business rules, to evaluate when business commitments have been broken, and to determine what corrective actions are best suited to automatically initiate.

With the rapid advancement of dynamic e-business technology, organizations are no longer satisfied with isolated e-business applications and have the heavy burden of application integration. Corporate customers prefer to have an industry solution that is customized for their needs and ready to be used. IT consulting institutions, like IBM Global Services, have the growing pressure to deliver domain-specific solutions on time and at a low cost. A dynamic e-business solution refers to an integrated set of applications and procedures that constitute cross-enterprise business processes such as customer relationship management (CRM) and supplier chain management (SCM). The key enabler of the next generation business process management allows customers monitor and control their assets from the perspectives of business processes. Such new paradigm for business process management is coined as Business Activity Monitoring (BAM). Compared with traditional management domains, BAM covers monitoring and control at level of business processes. Hence, BAM subsumes conventional system management, application management, and network management. It provides an end-to-end business process management for domain-specific solution through policies and mechanisms on core process real-time monitoring, exception healing and repair, alert and report infrastructure, process event infrastructure, monitor/configuration agent deployment, solution management decision support for optimization of source selection and supply chain inventory, and predictive/proactive business process performance optimization.

One of the key challenges of using business policies to drive BAM, is to seamlessly integrate this policy into the components of the business application. Additionally, we seek to reduce the complexity of the application development process. There are two objectives:

1. Business policies are high level abstraction best suited to the modeling of a business system. Accordingly, these policies must be interrogated to generate business rules that represent these policies at run time.
2. Use of business rules must be integrated into the application monitoring components such that they may be invoked to test conditions and determine actions by the system.

The functional elements that comprise Rule-based Business Activity Monitoring (RuleBAM), a novel framework whose objective is to support the requirements of dynamic sense and control of business applications will now be described. RuleBAM is composed of a customized assemblage of built-time and run-time technologies that includes: business rules and rule engines, that when taken as a whole, form a new method for supporting policy driven business application management enabled by business rules.

Within the context of the Meta-Rules System the key objectives of RuleBAM are:

Integration of business process definition and business policy into a unified rules based framework.
Programming artifacts and business processes that seamlessly invoke business rules.
Exploitation of Meta-Rules System to supporting Meta and business rule resolution and invocation.
Business process commitment monitoring based on policy as represented by business rules.
Capability of updates and changes made to the rules transparent to the underlying system by changing business policy.
Capability of "hot deployment" of rules (by changes made to the policy or process), thus helping to build an adaptive system.
Enable an end-to-end rule-based mechanism to monitoring business solutions.

Figure 5:
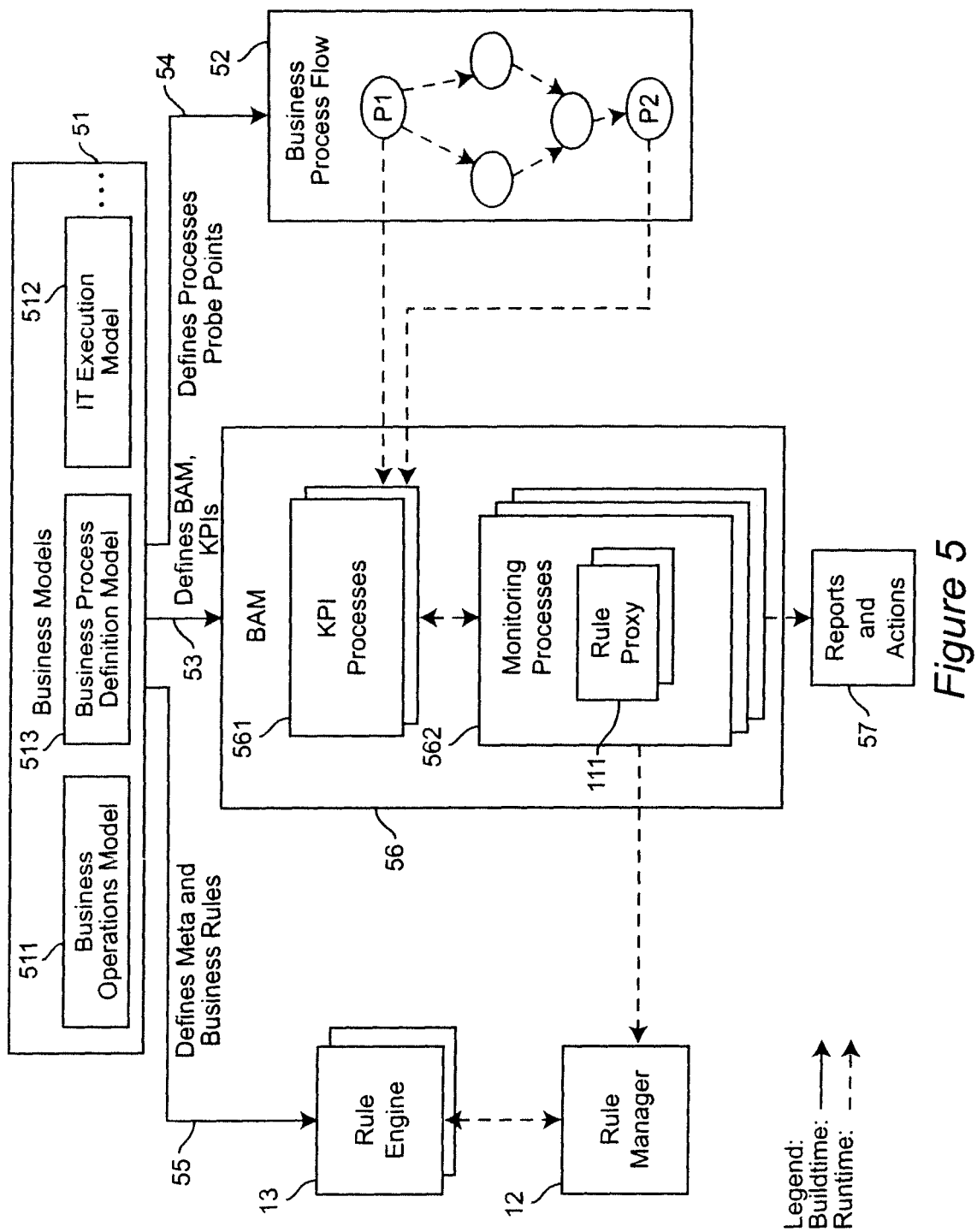
FIG. 5 is a block diagram showing the architecture of the Rule-based Business Activity Monitoring (RuleBAM)

FIG. 5 presents an illustration of RuleBAM architecture that contains the key elements of a Meta-Rules System (Application Program 11, Rule Manager 12 and Business Rule Engine 13) to support rules based Business Activity Monitoring. Referring again to FIG. 5, this architecture presents a system with build time and runtime components that when coordinated constructs a working rule based business activity monitoring system, based on the Meta-Rules System. This is described as flows.

At system build time, RuleBAM is defined and specified using business models 51 that include such representation as business operations model 511, business execution model 512 and business processes definitions model 513. In particular, the business processes definition model 513 specifies how performance of business process flows 52 is to be monitored and measured. This specification includes:

a. Key Performance Indicators (KPIs) 53 that define thresholds and objectives that business activities are expected to meet. Should exceptions occur, these are intended to be called out during the monitoring process.
b. Probe Points 54 that are inserted into business processes to provide event information reflecting the character and progress of the business process.
c. Meta and Business Rules 55 which are used by the Meta-Rules System and describe the Meta-rules (rules for selecting business rules) and business rules.

During runtime, business process flows 52 execute, and as appropriate, probe points 54 issue events that contain information on business activity. Probe point information is sent to the BAM system 56 KPI Processor 561 which determines what to do with the information. For example, if probe point P1 and P2 reflect the length of time to perform processes, the KPI Processor 561 must determine if the threshold, specified and contained in a business rule, has been exceeded. The KPI Processor 561 invokes the Monitor Process 562 to evaluate the information. Within the programming logic of the Monitor Process 562 are Rule Proxies which are used as input to the Meta-Rules System.

Rule Proxies are forwarded to the Rule Manager 12 which, using the process described in FIG. 4, invokes the Meta-rules and then the business rules contained in the Business Rules Engine 13. Rule evaluation information is returned to the Monitor Process 562. The performance threshold is compared to the actual business process performance and a report is issued 57.

Figure 6:
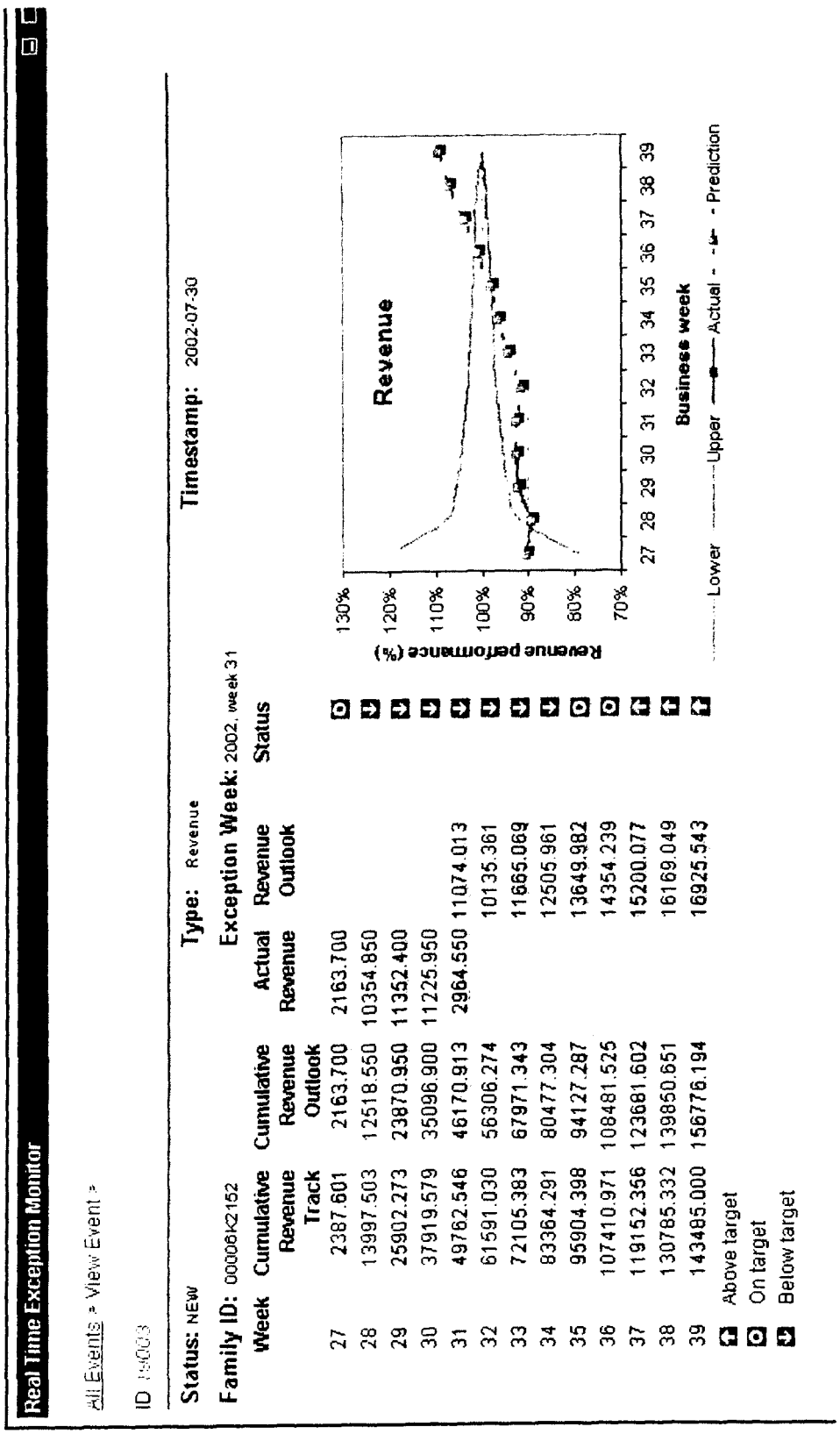
FIG. 6 is a table and graph showing an example of Business Activity Monitoring Performance Interface.

An example of a Business Activity Monitoring Performance Interface is illustrated in FIG. 6. This is an example of revenue system alert. Selecting the event detail page of a revenue alert in the top-level view of the user interface provides the quarter-to-date revenue, a revenue outlook, and a revenue track. The chart allows users to assess whether the quarter-to-date sales are on track to meet the end-of-quarter target. It also displays the latest revenue projection, which enables users to determine pro-actively if their business commitments are at risk.

Figure 7:
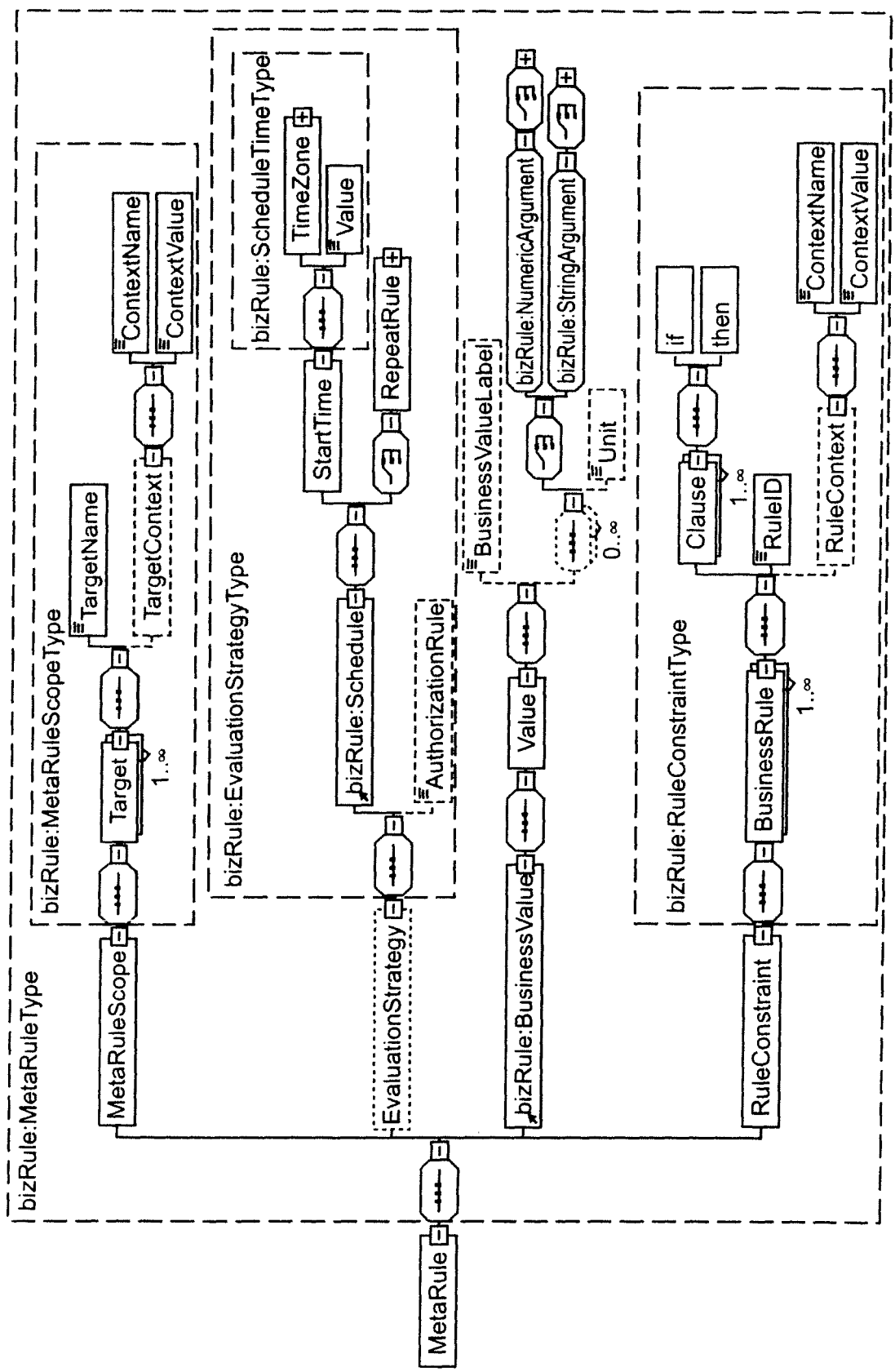
FIG. 7 is a block diagram showing the Meta-Rules Schema according to the invention.

Two examples of Meta-Rules are presented as follows. In these examples the description of the meta-rules described, followed by the expression of the meta-rule based on a schema presented in FIG. 7, to which reference is now made.

1. If the intent is to determine the cost for a product for a customer, determine the appropriate business catalog, and select rule engine that supports it, and select the business rule that generates the most customer value (for example least cost, or fastest delivery time). The XML Schema is illustrated as follows:

```
<?xml version="1.0" encoding="UTF-8"?>
    <bizRule:MetaRule
    xmlns:bizRule="http://www.ibm.com/namespaces/autonomic/policy/
        language/1.2"
    xmlns:xsi="http://www.w3.org/2001/XMLSchema-instance"
    xsi:schemaLocation="http://www.ibm.com/namespaces/autonomic/policy/
        language/1.2
    D:\$BPM3\BPMPOL~1\POLICY~1\MetaRules.xsd">
        <MetaRuleScope>
            <Target>
            <TargetName> product_cost </TargetName>
```

-continued

```
        <TargetContext>
            <contextName>goal</contextName>
            <contextValue> least_cost </contextValue>
        </TargetContext>
    </Target>
</MetaRuleScope>
<BusinessValue>
    <Value> <BusinessValueLabel> highest
        </BusinessValueLabel></Value>
</BusinessValue>
<RuleContstraint>
    <BusinessRule>
        <Clause>
            <if> intent = improve_customer_product </if>
            <then> select(business_rule) and
                select(business_rule_engine)
        </then>
        </Clause>
        <RuleID/>
    </BusinessRule>
</RuleContstraint>
</bizRule:MetaRule>
```

2. If the intent is to select a service provider to fulfill a business process, based on the type of processes indicated, select the best evaluation method and rule set to generate an optimum selection. The XML Schema is illustrated as follows:

```
<?xml version="1.0" encoding="UTF-8"?>
    <bizRule:MetaRule
            xmlns:bizRule="http://www.ibm.com/namespaces/au
            tonomic/policy/ language/1.2"
    xmlns:xsi="http://www.w3.org/2001/XMLSchema-instance"
    xsi:schemaLocation="http://www.ibm.com/namespaces/autonomic/policy/
        language/1.2
    D:\$BPM3\BPMPOL~1\POLICY~1\MetaRules.xsd">
    <MetaRuleScope>
        <Target>
        <TargetName> business_process </TargetName>
        <TargetContext>
            <contextName>goal</contextName>
            <contextValue> efficient </contextValue>
        </TargetContext>
        </Target>
    </MetaRuleScope>
    <BusinessValue>
        <Value> <BusinessValueLabel> medium
            </BusinessValueLabel></Value>
    </BusinessValue>
    <RuleContstraint>
        <BusinessRule>
            <Clause>
                <if> intent = select_service_provider </if>
                <then> select(evaluation_method) and
                    select(business_rule)
            </then>
            </Clause>
            <RuleID/>
        </BusinessRule>
    </RuleContstraint>
    </bizRule:MetaRule>
```

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of business rule selection and use in performing an application program comprising the steps of:
creating, at build time of the application program, one or more meta-rules for selecting one or more business rules, wherein the one or more meta-rules and the one or more business rules are maintained external to the application program;
automatically selecting, by a hardware processor, at a run time of the application program, for each rule proxy embedded in the application program, at least one of the one or more business rules, the automatic selection comprising:
receiving, at the run time of the application program by a rules manager, a rule proxy request from a rule proxy embedded in the application program, the rule proxy being embedded in the application program prior to the run time of the application program, the rules manager logically residing between the application program and the rule proxy of the application program;

invoking first, at the run time of the application program, by a rules engine at least one of the one or more meta-rules to select, based on the one or more meta-rules, at least one of the business rules in accordance with said rule proxy request; and invoking second, at the run time of the application program, by the rules engine, the selected business rule;

integrating the selected business rule into the application program to create a revised application program; and executing the revised application program.

2. The method of business rule selection recited in claim 1, further comprising the step of providing, by the hardware processor, a capability of updating to the business rules transparent to an underlying system by changing said one or more meta-rules.

3. The method of business rule selection recited in claim 2, further comprising the step of providing, by the hardware processor, a capability of changing rules by changing policy or process.

4. The method of business rule selection recited in claim 3, wherein the step of providing the capability of changing rules by changing policy or process is performed without requiring explicit changes to business processes.

5. The method of business rule selection recited in claim 3, further comprising the step of providing, by the hardware processor, an end-to-end rule-based mechanism to enable business solutions.

6. The method of business rule selection recited in claim 1, wherein the rule proxy contains abstract references that indicate program intent, optional context, state machine information and parametric data, and indications of a use of rules to provide information and evaluation by programming logic of the application program; and the method further comprising:
selecting a first business rule engine to invoke;
selecting a second business rule engine to invoke;
determining that additional context information is required prior to invoking the selected business rule; and
obtaining context data, the context data obtained by a state machine instructing a context manager to obtain data from at least one of a data store and a business artifact, wherein the invoking of the selected business rule is performed on the second business rule engine.

7. A computer system for business rule selection and use in performing an application program comprising:

at least one processor;

a memory coupled to the at least one processor;

one or more meta-rules, created at build time of the application program, for selecting one or more business rules, wherein the one or more meta-rules and the one or more business rules are maintained external to the application program; and a run time process for automatically selecting and administering at least one of the one or more business rules, the automatic selection and administration further comprising:

receiving, at the run time of the application program by a rules manager, a rule proxy request from a rule proxy, the rule proxy being embedded in the application program prior to a run time of the application program and the rules manager logically residing between the application program and the rule proxy of the application program;

invoking first, at the run time of the application program by a rules engine, at least one of the one or more meta-rules to select, based on the one or more meta-rules, at least one of the business rules in accordance with the rule proxy request; and invoking second, at the run time of the application program by the rules engine, the selected business rule;

integrating the selected business rule into the application program to create a revised application program; and executing the revised application program.

8. The computer system for business rule selection recited in claim 7, wherein updates to the business rules are made transparent to an underlying system by changing said one or more meta-rules.

9. The computer system for business rule selection recited in claim 8, further comprising a capability of changing rules by changing policy or process embodied in said one or more meta-rules.

10. The computer system for business rule selection recited in claim 9, wherein the capability of changing rules does not require explicit changes in business processes.

11. The computer system for business rule selection recited in claim 9, further comprising an end-to-end rule-based mechanism to enable business solutions.

* * * * *